(No Model.) 2 Sheets—Sheet 1.
F. A. GOOCH & L. WALDO.
PROCESS OF REDUCING ALUMINIUM.
No. 527,849. Patented Oct. 23, 1894.
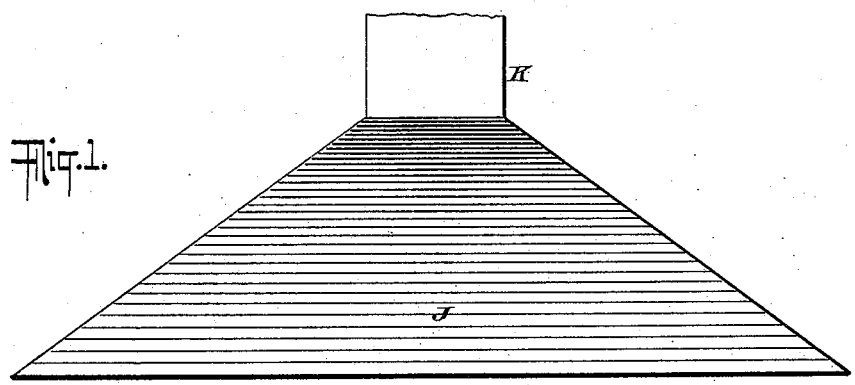
Fig. 1.
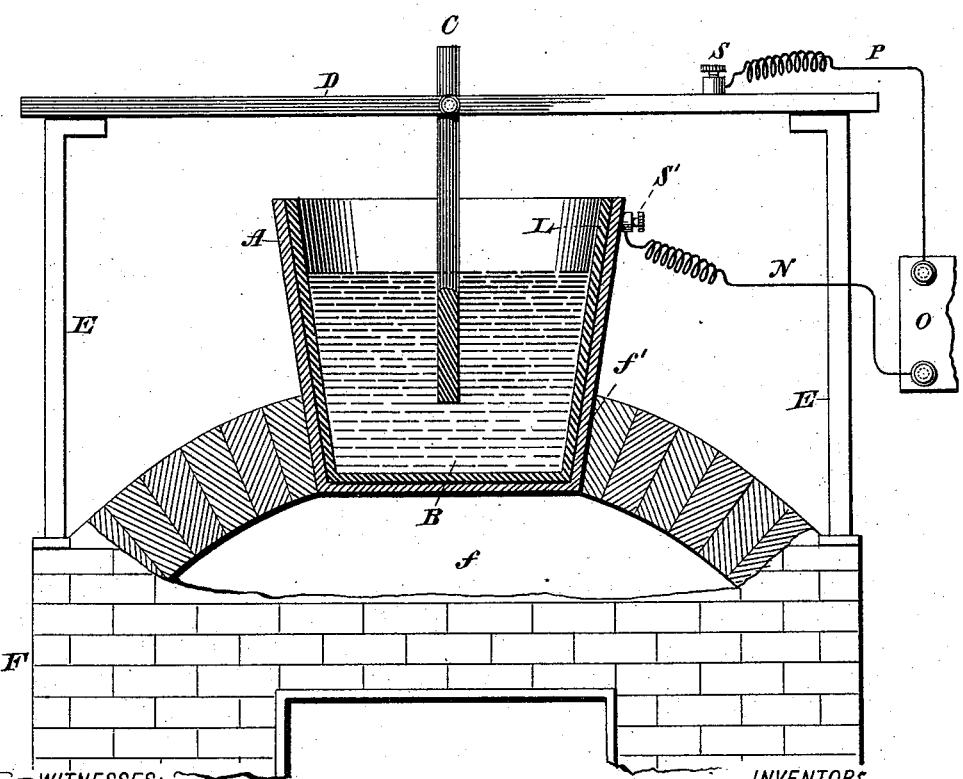
WITNESSES:
Gustave Dieterich
Joseph F. O'Brien
INVENTORS
Frank A. Gooch and
Leonard Waldo
BY Frank L. Cranford
ATTORNEY.

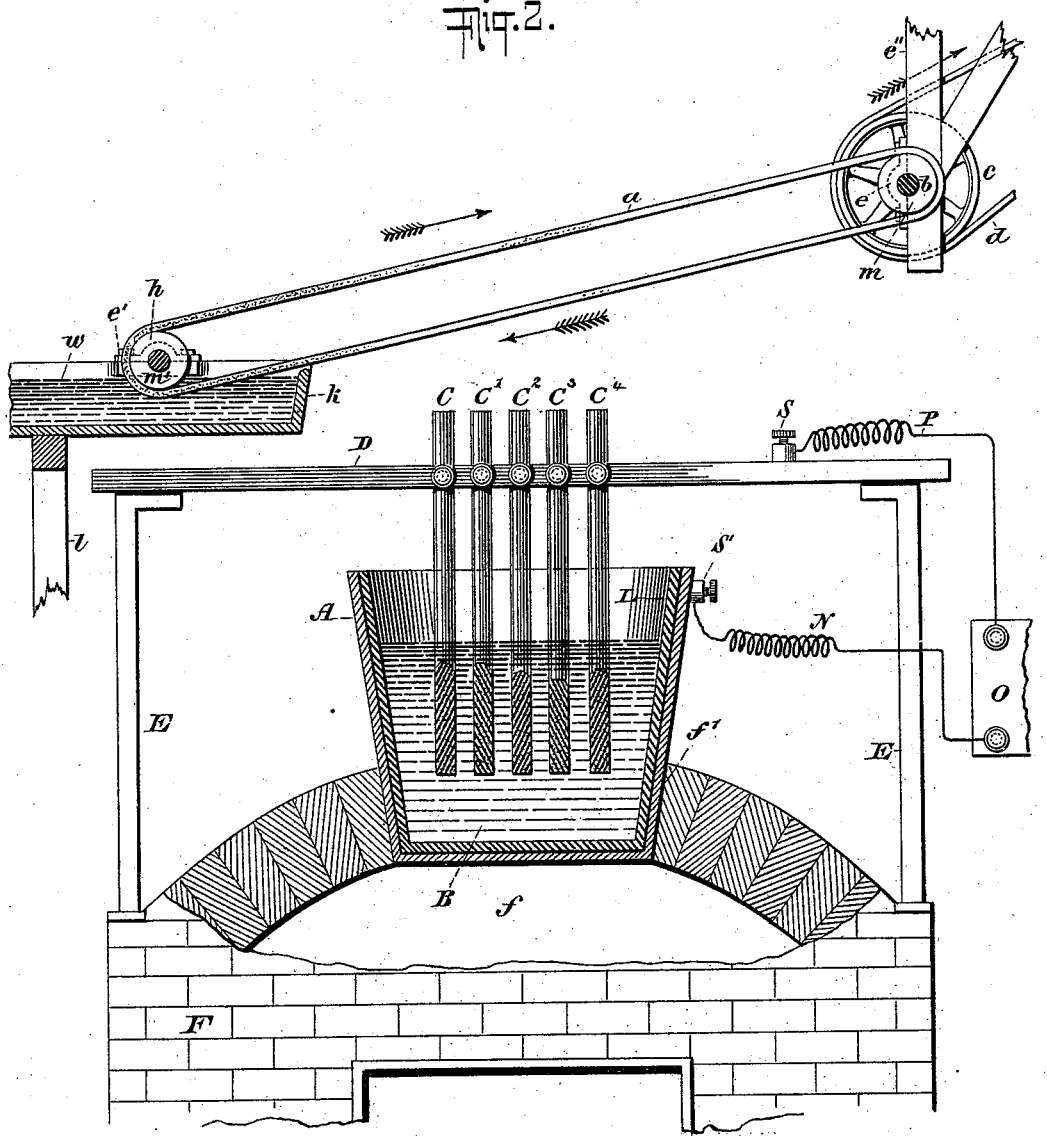

UNITED STATES PATENT OFFICE.

FRANK A. GOOCH, OF NEW HAVEN, AND LEONARD WALDO, OF BRIDGEPORT, CONNECTICUT; SAID WALDO ASSIGNOR TO THE WALDO FOUNDRY, OF NEW JERSEY.

PROCESS OF REDUCING ALUMINIUM.

SPECIFICATION forming part of Letters Patent No. 527,849, dated October 23, 1894.

Application filed December 26, 1893. Serial No. 494,651. (No specimens.)

*To all whom it may concern:*

Be it known that we, FRANK A. GOOCH, residing at New Haven, in the county of New Haven, and LEONARD WALDO, residing at Bridgeport, in the county of Fairfield, State of Connecticut, have invented certain new and useful Improvements in Processes of Reducing Aluminium; and we do hereby declare the following to be a full, clear, and exact description of the invention, such as will enable others skilled in the art to which it appertains to make and use the same.

The invention described herein relates to processes for the reduction of aluminium from its compounds by the electrolysis of a suitable fused mass containing such compounds.

In an application filed by us September 1, 1893, and serially numbered 484,561, we have described and claimed an improved process for reducing aluminium from its compounds, which, in general terms consists in passing an electric current through a suitable fused bath containing a suitable compound of aluminium, thereby electrolyzing the bath, and in introducing hydrogen into the bath.

In a second application filed by us September 6, 1893, and serially numbered 484,905, we have described and claimed an improved process for producing aluminium from its compounds, which in general terms consists in passing an electric current through a suitable fused bath containing a suitable compound of aluminium, thereby electrolyzing that bath, and in introducing into the bath a suitable gaseous compound of hydrogen.

The invention herein described relates to the employment in processes of the class above described for the reduction of aluminium from its compounds of hydrogen in combination in suitable solid compounds, in the manner and for the purposes herein set forth.

In general terms, our invention comprises an improved process for reducing aluminium from its compounds which consists in passing an electric current through a suitable fused mass containing a suitable compound of aluminium, thereby electrolyzing the bath, and in introducing into the fused mass hydrogen in combination in a suitable solid compound.

The compound of aluminium used should be one which will fuse at a temperature and under conditions which shall be practically attainable.

More especially our invention relates to the reduction of aluminium from a suitable halogen compound thereof. In practice, we find that the halogen compounds of aluminium, which are most suitable and best adapted to be used in our process, are the chloride of aluminium and the fluoride of aluminium.

The specific form of our invention, so far as it relates to such last named reduction, consists in general terms in passing an electric current through a suitable fused bath, containing a suitable halogen compound of aluminium, thereby electrolyzing the bath, and in introducing into such bath hydrogen in combination in a suitable solid compound.

For convenience, we describe our invention with special reference to the reduction of aluminium from its chloride, it being understood, however that our invention is also applicable to other compounds of aluminium.

We find it convenient in our improved process to employ hydrogen in combination in suitable hydrous salts or salts containing combined water, either as water of crystallization or as water of constitution or both. We preferably employ those salts into whose composition water enters in a considerable degree. It is also desirable not to use any salt, which, upon surrendering its water to the bath, will add any deleterious element to the bath.

While our invention is applicable to a large class of substances, we shall for convenience describe it with reference to the use of hydrated oxalic acid, whose formula is $H_2O_2C_2O_2.2H_2O$, and which, containing both water of crystallization and water of constitution, we find to be a suitable substance for our purpose. It is to be understood, however, that our description is in substance applicable to the use of all other suitable solid substances containing combined water either of crystallization or of constitution or both.

In the accompanying drawings, which are hereby made a part of this specification, is shown one form of apparatus suitable to the practice of our invention. We do not, however, limit ourselves to the apparatus shown, since any other suitable apparatus would answer equally well for the practice of our invention.

Figure 1 represents a sectional diagrammatic view of the apparatus employed by us. Fig. 2 represents a sectional view of a modified form of apparatus employed by us.

Similar letters refer to similar parts throughout the drawings.

F is a furnace having a fire box $f$, and opening $f'$ in the top of the furnace, into which is set a tapering crucible A, the same being supported by the sides of the opening $f'$.

The construction of the crucible and the arrangement of the electrodes and conductors are fully described hereinafter.

$s\ s'$ are binding posts for the conductors N, P. B. is the bath contained in the crucible A, through which the electric current is passed.

In the practice of our invention, so far as it relates to the reduction of aluminium from its chloride, we preferably prepare a bath by fusing in a suitable tank or crucible A, and in proper proportions, the chloride of aluminium and the chloride of an alkaline metal, preferably sodium, with the fluoride of aluminium and the fluoride of sodium. A convenient way to form a suitable bath is to combine the double chloride of aluminium and sodium (represented by the formula $2NaCl.Al_2Cl_6$) with the mineral cryolite. We find it of advantage to add to the combination just named an additional amount of chloride of sodium in excess of the amount necessary to form the double chloride. These ingredients are preferably mingled together in the following proportions: the double chloride of aluminium and sodium, fifteen parts; cryolite, fifty-five parts; sodium chloride, thirty parts; but these proportions are variable serviceably within wide limits, without materially affecting the operation or function of the bath, as, in fact, any proportions which may be found suitable may be employed.

The reason for employing cryolite or the fluorides of aluminium and sodium in the bath is the well known fact that, when they are present and electrolysis takes place, the aluminium melts and flows to globules, while, when the bath contains only the chlorides named, the aluminium is obtained in the form of a powder, which has to be further treated before it can be made commercially available. The object of adding the excess of sodium chloride to the bath is to make the bath more liquid. It is also advantageous in diluting the cryolite. It is not, however, essential to our invention that the excess of sodium chloride should be present; nor that the cryolite, or fluorides of aluminium and sodium, should form part of the bath, when the chlorides already mentioned are present.

Our invention indeed (considered only in its relation to the reduction of aluminium from its chloride or fluoride) is applicable to any bath containing a suitable halogen compound of aluminium, and any other suitable ingredients which will permit or enable the bath to fuse at a sufficiently low temperature, and will admit of the halogen compound of aluminium being decomposed by electrolysis.

Instead of forming the double chloride of aluminium and sodium separately, and then adding it to the bath, it will be sufficient to place the chloride of aluminium in the bath, and then to add chloride of sodium in such quantity that part of it may unite chemically with the chloride of aluminium to form the double chloride, while the remainder forms the excess of sodium chloride needed for the bath above described; or the order of introduction of the sodium chloride and aluminium chloride may be reversed, the sodium chloride being added first. Usually this will be found preferable, as the chloride of aluminium is very volatile until brought in contact with the sodium chloride. In place of the excess of sodium chloride, we may employ a certain proportion of chloride of potassium (which is useful in making the bath more fluid), or of some other of the alkaline metals. In case of any such substitution in the ingredients of the bath, the proportions of all the ingredients used are suitably readjusted, if necessary.

For example, if the chloride of potassium be used, the ingredients are preferably mingled together in the following proportions: cryolite, fifty-five parts; chloride of aluminium, twelve parts; chloride of sodium, nineteen parts; chloride of potassium, fourteen parts; but these proportions are variable serviceably within considerable limits, without materially affecting the operation or function of the bath, as, in fact, any proportions which may be found suitable may be employed.

The crucible A preferably employed by us in the operation of our invention consists of a tank of iron, lined with compacted carbon. The carbon lining L of this tank serves as the cathode, the iron of the tank being connected by the conductor N with the negative pole of a dynamo-electric machine or other suitable source of electricity. The anode C is a detached carbon electrode partly immersed in the bath B and connected in the following manner with the source of electricity: We preferably suspend the anode C from an iron bar D raised above the crucible and resting on wooden supports E E. The bar D is connected by the conductor P to the positive pole of the source of electricity. If desired, the cathode may also be formed of a detached carbon suspended in a similar way to that just described for the anode, or otherwise supported, and partially immersed in the bath.

If desired, a number of separate carbons may be used to form the electrodes as shown in Fig. 2, where C, C', $C^2$, $C^3$, and $C^4$, all suspended from the bar D, collectively form the anode, the relative superficial areas of the electrodes in any particular case being adjusted so as to secure the greatest economy in action. In place of a carbon anode, an anode of any other suitable material, as of platinum, may be used.

The bath may be fused and the fusion may be maintained by the application of heat from any suitable source, as externally from a furnace F. The temperature required to fuse the baths suggested above is that of a dull red heat. We may also fuse the ingredients of the bath in a separate apparatus, and introduce the same in a molten condition into the tank at the beginning of the process, the fusion being thereafter maintained in any suitable way. When the electric current is passed through the bath and electrolysis takes place, aluminium is deposited at the cathode, and the halogens (chiefly chlorine) are liberated at the anode. It is well known that these gases, in a free state are highly noxious to health. On this account, and for the further reason that they attack and quickly destroy the positive electrode in the apparatus used in any process similar to the one described, their escape in a free state would render such process commercially useless. To obviate these difficulties and to accomplish other desirable results, we add to the bath from time to time suitable quantities of hydrated oxalic acid ($H_2O_2C_2O_2.2H_2O$) or other substance used. The said substance being decomposed in the bath, hydrogen from the combined water contained in the substance is supplied to the bath in a substantially continuous manner, and unites with the halogen elements liberated by the electrolysis, which then escape at the anode in the form of hydrochloric or hydrofluoric acid. These gases are easily controlled and disposed of, without injury to apparatus or workmen by appropriate means external to the bath as by the use of a flue K, having a strong draft and provided with a hood J projecting over the crucible A; or cloths saturated with water may be suspended over the crucible, the escaping gases being taken up by the water, whose extraordinary power of acting as a solvent for hydrochloric and hydrofluoric acids is well known. Such an arrangement is shown in Fig. 2, where $a$ represents an endless band or apron of cloth or other suitable fabric, passing over drums $m$, $m'$ attached to shafts $b$ $h$. The shaft $b$ revolves in journal boxes $e$ and is supported in any suitable manner, as by a strip $e''$ suspended from the ceiling. The shaft $h$ revolves in boxes $e'$ formed on the edges of the trough $k$. The shafts and band or apron $a$ are kept in revolution in the direction indicated by the arrows by power from any suitable source transmitted by the belt $d$, passing over the pulley $c$, which is rigidly attached to the shaft $b$. The shaft $b$ is hung somewhat higher than the shaft $h$. The drum $m'$ on shaft $h$ runs close to or under the surface of water $w$ contained in a shallow pan or trough $k$, having suitable support $l$. The band or apron $a$ being inclined passes through the water $w$ at the lower side of the drum $m'$ and is thus kept saturated with water. Thus saturated it passes continuously over the crucible.

Where hydrated oxalic acid is used, it is added to the bath gradually in quantity sufficient to prevent the escape of free halogens, but a moderate excess of the same does no harm.

In the practical operation of our invention, where we use the suggested bath composed of the double chloride of aluminium and sodium, and the fluorides of aluminium and sodium, with or without an excess of chloride of sodium, we have found that we obtain at the anode hydrochloric acid almost exclusively, with very little trace of fluorine. This shows that the aluminium deposited at the cathode is derived chiefly from the chloride of aluminium in the bath, and we have found also that, by the addition to the bath from time to time of chloride of aluminium in sufficient quantities, the bath will be replenished and the process will be a substantially continuous one through a considerable period of time.

We have spoken of fluorine being set free, though we are aware that it is considered very difficult to isolate this element. We however, use the word "fluorine" merely for convenience, meaning thereby to include not only free fluorine, if any be liberated, but also any compound thereof which might be set free at the anode if hydrogen either free or in combination were not used in the process.

As before stated, the aluminium is deposited at the cathode, where it melts forming globules, which (when either of the suggested baths whose proportions are herein given is used) gather at the bottom of the bath, the aluminium having a higher specific gravity than the fused bath. The aluminium may then be removed in any suitable or convenient manner, as for example by means of a ladle lined and covered with carbon, or by drawing it off through a suitable opening at the bottom. In case a bath should be used whose specific gravity is higher than that of aluminium, the aluminium would of course rise to the top, where it could be easily removed.

In the process herein described, we use an electric current of suitably low electro-motive force, usually of from four to ten volts, but the voltage of the current required will depend on the size and form of the electrodes, as well as on the composition of the bath, it being only necessary to have a voltage sufficient to decompose electrolytically the compound of aluminium in the bath under all the existing conditions of resistance, and of chemical constitution. The electric current which we employ in our process, and which is herein referred to as being passed through the bath, is employed solely for purposes of electrolysis.

The salt or other compound from the decomposition of which the hydrogen is obtained for our process may, in the first instance, be introduced into the bath before or after the electric current is passed through the same, or simultaneously therewith, the order of operations being unimportant.

It being possible to form a large number of different baths to which our invention would be applicable, we do not limit ourselves to the use of any particular bath which has been described herein.

In the process herein described, it is not our purpose to employ hydrogen in combination in suitable solid compounds as an agent in effecting the reduction of the metal from the aluminium compounds used. The objects of introducing hydrogen in such combination into the bath in our improved process herein described are to secure a more uniform intermixture of the ingredients of the bath; and, where halogen compounds of aluminium are present in the bath, largely to protect the anodes from the corrosive action of the halogens set free in the process, and to convert such halogens into a more manageable form.

Where the solid substance from which the hydrogen is derived contains water in combination, there is likely to be some oxidation of the anode, if the material of the anode is oxidizable; but, unless such material is very easily oxidizable, the waste of the anode will usually be much less than would be the case if the anode were exposed to the action of free halogens.

Having described our invention, what we claim, and desire to secure by Letters Patent, is—

1. As an improvement in the art of manufacturing aluminium by reduction from its compounds, the herein described process which consists in passing an electric current through a suitable fused bath containing a suitable compound of aluminium, thereby electrolyzing the same and in introducing into the bath hydrogen in combination in a suitable solid compound substantially as and for the purposes set forth.

2. As an improvement in the art of manufacturing aluminium by reduction from its compounds, the herein described process which consists in passing an electric current through a suitable fused bath containing a suitable halogen compound of aluminium, thereby electrolyzing the same and in introducing into the bath hydrogen in combination in a suitable solid compound, substantially as and for the purposes set forth.

3. As an improvement in the art of manufacturing aluminium by reduction from its compounds, the herein described process which consists in passing an electric current through a suitable fused bath containing a suitable halogen compound of aluminium, thereby electrolyzing the same and in adding to the bath a suitable solid compound containing water in combination, substantially as and for the purposes set forth.

4. As an improvement in the art of manufacturing aluminium by reduction from its compounds, the herein described process which consists in passing an electric current through a suitable fused bath, containing a suitable halogen compound of aluminium, thereby electrolyzing the same and in adding to the bath a suitable salt containing water in combination, substantially as and for the purposes set forth.

5. As an improvement in the art of manufacturing aluminium, the herein described process which consists in passing an electric current through a suitable fused bath, containing the chloride of aluminium thereby electrolyzing the same and in adding to the bath a suitable salt containing water in combination, substantially as and for the purposes set forth.

6. As an improvement in the art of manufacturing aluminium, the herein described process, which consists in passing an electric current through a suitable fused bath containing the chloride of aluminium and the chloride of an alkaline metal, thereby electrolyzing the same and in adding to the bath a suitable salt containing water in combination, substantially as and for the purposes set forth.

7. As an improvement in the art of manufacturing aluminium, the herein described process which consists in passing an electric current through a suitable fused bath containing the chloride of aluminium and the chloride of sodium, thereby electrolyzing the same and in adding to the bath a suitable salt containing water in combination, substantially as and for the purposes set forth.

8. As an improvement in the art of manufacturing aluminium, the herein described process which consist in forming a bath by fusing the chloride of aluminium and the chloride of an alkaline metal with the fluoride of aluminium and the fluoride of sodium, passing an electric current through the fused mass, thereby electrolyzing the same, and in adding to the bath a suitable salt containing water in combination, substantially as and for the purposes set forth.

9. As an improvement in the art of manufacturing aluminium, the herein described process which consists in forming a bath by fusing the chloride of aluminium and the chloride of sodium with the fluoride of aluminium and the fluoride of sodium, passing an electric current through the fused mass, thereby electrolyzing the same, and in adding to the bath a suitable salt containing water in combination, substantially as and for the purposes set forth.

10. As an improvement in the art of manufacturing aluminium, the herein described process which consists in fusing together the chlorides of aluminium, sodium and potassium, and the fluorides of aluminium and sodium, passing an electric current through the fused mass, thereby electrolyzing the same, and in adding to the bath a suitable salt containing water in combination, substantially as and for the purposes set forth.

11. As an improvement in the art of manufacturing aluminium, the herein described process which consists in forming a bath by fusing the chloride of aluminium and the chloride of an alkaline metal with the fluoride of aluminium and the fluoride of sodium, passing an electric current through the fused mass, thereby electrolyzing the same, and in adding to the bath a suitable salt containing water of crystallization, substantially as and for the purposes set forth.

12. As an improvement in the art of manufacturing aluminium, the herein described process which consists in forming a bath by fusing the chloride of aluminium and the chloride of sodium with the fluoride of aluminium and the fluoride of sodium, passing an electric current through the fused mass, thereby electrolyzing the same, and in adding to the bath a suitable salt containing water of crystallization, substantially as and for the purposes set forth.

13. As an improvement in the art of manufacturing aluminium, the herein described process which consists in fusing together the chlorides of aluminium, sodium and potassium, and the fluorides of aluminium and sodium, passing an electric current through the fused mass, thereby electrolyzing the same, and in adding to the bath a suitable salt containing water of crystallization, substantially as and for the purposes set forth.

14. As an improvement in the art of manufacturing aluminium, the herein described process which consists in passing an electric current through a suitable fused bath containing a suitable halogen compound of aluminium, thereby electrolyzing the same and in adding to the bath hydrated oxalic acid, substantially as and for the purposes set forth.

15. As an improvement in the art of manufacturing aluminium, the herein described process which consists in passing an electric current through a suitable fused bath containing the chloride of aluminium, thereby electrolyzing the same and in adding to the bath hydrated oxalic acid, substantially as and for the purposes set forth.

16. As an improvement in the art of manufacturing aluminium, the herein described process, which consists in forming a bath by fusing together the chlorides of aluminium and sodium and the fluorides of aluminium and sodium, passing an electric current through the fused mass, thereby electrolyzing the same, and adding to the bath in suitable quantities hydrated oxalic acid, substantially as and for the purposes set forth.

FRANK A. GOOCH.
LEONARD WALDO.

Witnesses as to Frank A. Gooch:
SARAH W. GOOCH,
INA B. MORRISON.

Witnesses as to L. Waldo:
JOSEPH F. O'BRIEN,
MARION FOWLER.